(12) United States Patent
Nonaka et al.

(10) Patent No.: US 9,154,757 B2
(45) Date of Patent: Oct. 6, 2015

(54) IMAGING DEVICE

(75) Inventors: Yuichi Nonaka, Tokyo (JP); Takeru Kisanuki, Tokyo (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/373,454

(22) PCT Filed: Sep. 14, 2012

(86) PCT No.: PCT/JP2012/073564
§ 371 (c)(1),
(2), (4) Date: Jul. 21, 2014

(87) PCT Pub. No.: WO2013/128693
PCT Pub. Date: Sep. 6, 2013

(65) Prior Publication Data
US 2015/0009368 A1 Jan. 8, 2015

(30) Foreign Application Priority Data

Feb. 29, 2012 (JP) ................................. 2012-042749

(51) Int. Cl.
*H04N 9/64* (2006.01)
*H04N 5/217* (2011.01)
(Continued)

(52) U.S. Cl.
CPC ............... *H04N 9/646* (2013.01); *H04N 5/217* (2013.01); *H04N 5/2173* (2013.01); *H04N 9/045* (2013.01); *H04N 9/77* (2013.01); *H04N 2209/046* (2013.01)

(58) Field of Classification Search
CPC ...................................................... H04N 1/00
USPC .............................................. 348/242, 224.1
See application file for complete search history.

(56) References Cited

U.S. PATENT DOCUMENTS 8,284,271 B2 * 10/2012 Zimmer et al. ............ 348/223.1

8,558,911 B2 10/2013 Shiohara
(Continued)

FOREIGN PATENT DOCUMENTS

| JP | 2006-339028 A | 12/2006 |
| JP | 2008-301395 A | 12/2008 |
| JP | 2009-157733 A | 7/2009 |

(Continued)

*Primary Examiner* — Joel Fosselman
(74) *Attorney, Agent, or Firm* — Baker Botts L.L.P.

(57) ABSTRACT

An imaging device is provided with a lens distortion correction function that requires less circuit scale and does not degrade image resolution.

The imaging device having the lens distortion correction function is provided which includes a same-color interpolation unit that generates a lens distortion-corrected interpolation signal by using a same-color pixel in an image signal from an imaging element, a luminance signal generation unit that generates a luminance signal from the image signal from the imaging element, a first luminance signal generation unit and a second luminance signal generation unit that use the luminance signal generated by the luminance signal generation unit to generate a lens distortion-corrected interpolation signal, a lens distortion characteristics table data unit that holds information of coordinates after lens distortion characteristics correction in a memory, a coordinate/interpolation coefficient setting unit that individually generates interpolation coefficients for correcting lens distortion for each of the same-color interpolation unit, the first luminance interpolation unit, and the second luminance interpolation unit on the basis of information from the lens distortion characteristics table data unit, and a correction unit that outputs a lens distortion-corrected interpolation signal by correcting the signal from the same-color interpolation unit on the basis of a ratio between the interpolation signal generated by the first luminance interpolation unit and the interpolation signal generated by the second luminance interpolation unit.

6 Claims, 15 Drawing Sheets

(51) Int. Cl.
*H04N 9/04* (2006.01)
*H04N 9/77* (2006.01)

(56) References Cited

U.S. PATENT DOCUMENTS

2009/0179824 A1* 7/2009 Tsujimoto et al. ............... 345/7

2014/0009452 A1 1/2014 Shiohara

FOREIGN PATENT DOCUMENTS

| JP | 2009-170970 A | 7/2009 |
| JP | 2010-191390 A | 9/2010 |
| JP | 2011-61444 A | 3/2011 |
| JP | 2011-252993 A | 12/2011 |

* cited by examiner

$AL = A33*(1-\alpha)*(1-\beta)$
$+A35*\alpha*(1-\beta)$
$+A53*(1-\alpha)*\beta$
$+A55*\alpha*\beta$ (b)

$YL = Y33*(1-\alpha)*(1-\beta)$
$+Y35*\alpha*(1-\beta)$
$+Y53*(1-\alpha)*\beta$
$+Y55*\alpha*\beta$ (c)

$YH = Y33*(1-2\alpha)*(1-2\beta)$
$+Y34*2\alpha*(1-2\beta)$
$+Y43*(1-2\alpha)*2\beta$
$+Y44*2\alpha*2\beta$ (d)

$AL= A33*(1-\alpha)*(1-\beta)$
$+A35*\alpha*(1-\beta)$
$+A53*(1-\alpha)*\beta$
$+A55*\alpha*\beta$ (b)

$YL= Y33*(1-\alpha)*(1-\beta)$
$+Y35*\alpha*(1-\beta)$
$+Y53*(1-\alpha)*\beta$
$+Y55*\alpha*\beta$ (c)

$YH= Y34*(2-\alpha)*(1-2\beta)$
$+Y35*(2\alpha-1)*(1-2\beta)$
$+Y44*(2-\alpha)*2\beta$
$+Y45*(2\alpha-1)*2\beta$ (d)

AL:AH=YL:YH

AH=AL*YH/YL

IMAGING DEVICE

TECHNICAL FIELD

The present invention relates to an imaging device.

BACKGROUND ART

There is PTL 1 as a background art of the present technical field. PTL 1 describes that "A video signal processing circuit of the present invention is a video signal processing circuit in which image distortion occurs due to optical distortion aberration in image processing performed on a video signal input from an image sensor and which includes a distortion correction processing circuit that performs distortion correction processing on RAW image data before YC processing. According to this configuration, the distortion correction processing is performed on the RAW image data which is so-called raw data before being converted into YC image data, so that it is possible to reduce the size of a memory for storing data immediately before the distortion correction processing (RAW image data)". (See ABSTRACT)

CITATION LIST

Patent Literature

PTL 1: JP 2008-301395 A

SUMMARY OF INVENTION

Technical Problem

In a system as described above, it is preferable to be able to perform image processing without degradation of resolution by a small scale of circuit. Although the configuration described in PTL 1 can reduce the circuit scale as compared with a distortion correction using RGB or YUV signal, it is not a configuration that generates a RAW signal whose position is moved to a desired position. Further, in a normal color imaging element, a color filter is formed so that sets of 2*2 pixels are regularly arranged in vertical and horizontal directions and when the RAW data is interpolated, the same color pixels, the distance between which is long, are used, so there is a problem that the resolution is degraded.

The present invention solves the above problem and provides an imaging device that can perform image processing with less degradation of resolution with less circuit scale.

Solution to Problem

A summary of a typical one of the inventions disclosed in the present application will be briefly described as follows:

(1) An imaging device that images an object, the imaging device including: an imaging element including a plurality of color filters; a same-color interpolation unit that generates a lens distortion-corrected interpolation signal by using a same-color pixel in an image signal from the imaging element; a luminance signal generation unit that generates a luminance signal from the image signal from the imaging element; a first luminance interpolation unit and a second luminance interpolation unit that use the luminance signal generated by the luminance signal generation unit to generate a lens distortion-corrected interpolation signal; a lens distortion characteristics table data unit that holds information of coordinates after lens distortion characteristics correction in a memory; a coordinate/interpolation coefficient setting unit that individually generates interpolation coefficients for correcting lens distortion for each of the same-color interpolation unit, the first luminance interpolation unit, and the second luminance interpolation unit on the basis of information from the lens distortion characteristics table data unit; and a correction unit that outputs an interpolation signal that corrects a signal from the same-color interpolation unit from a ratio between the interpolation signal generated by the first luminance interpolation unit and the interpolation signal generated by the second luminance interpolation unit.

(2) An imaging device that images an object, the imaging device including: an imaging element including a plurality of color filters; a same-color interpolation unit that generates a lens distortion-corrected interpolation signal by using a same-color pixel in an image signal from the imaging element; a luminance signal generation unit that generates a luminance signal from the image signal from the imaging element; a first luminance interpolation unit and a second luminance interpolation unit that use the luminance signal generated by the luminance signal generation unit to generate a lens distortion-corrected interpolation signal; a lens distortion characteristics function arithmetic unit that calculates coordinates after lens distortion characteristics correction for each pixel on the basis of a preset lens distortion characteristics function; a coordinate/interpolation coefficient setting unit that individually sets interpolation coefficients for correcting lens distortion for each of the same-color interpolation unit, the first luminance interpolation unit, and the second luminance interpolation unit on the basis of information from the lens distortion characteristics function arithmetic unit; and a correction unit that outputs an interpolation signal that corrects a signal from the same-color interpolation unit from a ratio between the interpolation signal generated by the first luminance interpolation unit and the interpolation signal generated by the second luminance interpolation unit.

In this way, the imaging device according to the present application enables RAW data interpolation with less degradation of resolution by generating a post-correction RAW signal having a frequency component higher than that of the interpolation signal generated from same-color pixels at a desired correction position by using a luminance signal correlated with a frequency component of a RAW signal, and also realizes reduction of the circuit scale.

The imaging device according to the present application has functions such as scaling (magnification/reduction), lens distortion correction, rotation/viewpoint conversion, and pixel addition distortion correction by appropriately setting the correction position of the post-correction RAW signal.

Advantageous Effects of Invention

According to the present invention, it is possible to provide an imaging device that can perform image processing with less degradation of resolution with less circuit scale.

BRIEF DESCRIPTION OF DRAWINGS

FIG. 3, an item (a) is a supplementary explanatory diagram (1) of an interpolation coefficient pattern 1 ($\alpha<0.5$ and $\beta<0.5$), and item (b) is a supplementary explanatory diagram (2) of an interpolation coefficient pattern 1 ($\alpha<0.5$ and β<0.5), and item (c) is a supplementary explanatory diagram (3) of an interpolation coefficient pattern 1 (α<0.5 and β<0.5), and an item (d) is a supplementary explanatory diagram (4) of an interpolation coefficient pattern 1 (α<0.5 and β<0.5);

FIG. 4, an item (a) is a supplementary explanatory diagram (1) of an interpolation coefficient pattern 2 (α>=0.5 and β<0.5), an item (b) is a supplementary explanatory diagram (2) of an interpolation coefficient pattern 2 (α>=0.5 and β<0.5), an item (c) is a supplementary explanatory diagram (3) of an interpolation coefficient pattern 2 (α>=0.5 and β<0.5), and an item (d) is a supplementary explanatory diagram (4) of an interpolation coefficient pattern 2 (α>=0.5 and β<0.5);

DESCRIPTION OF EMBODIMENTS

Hereinafter, embodiments of the present invention will be described with reference to the drawings.

First Embodiment

The present embodiment will be described using an example of a camera, which is an example of an imaging device.

Figure 1:
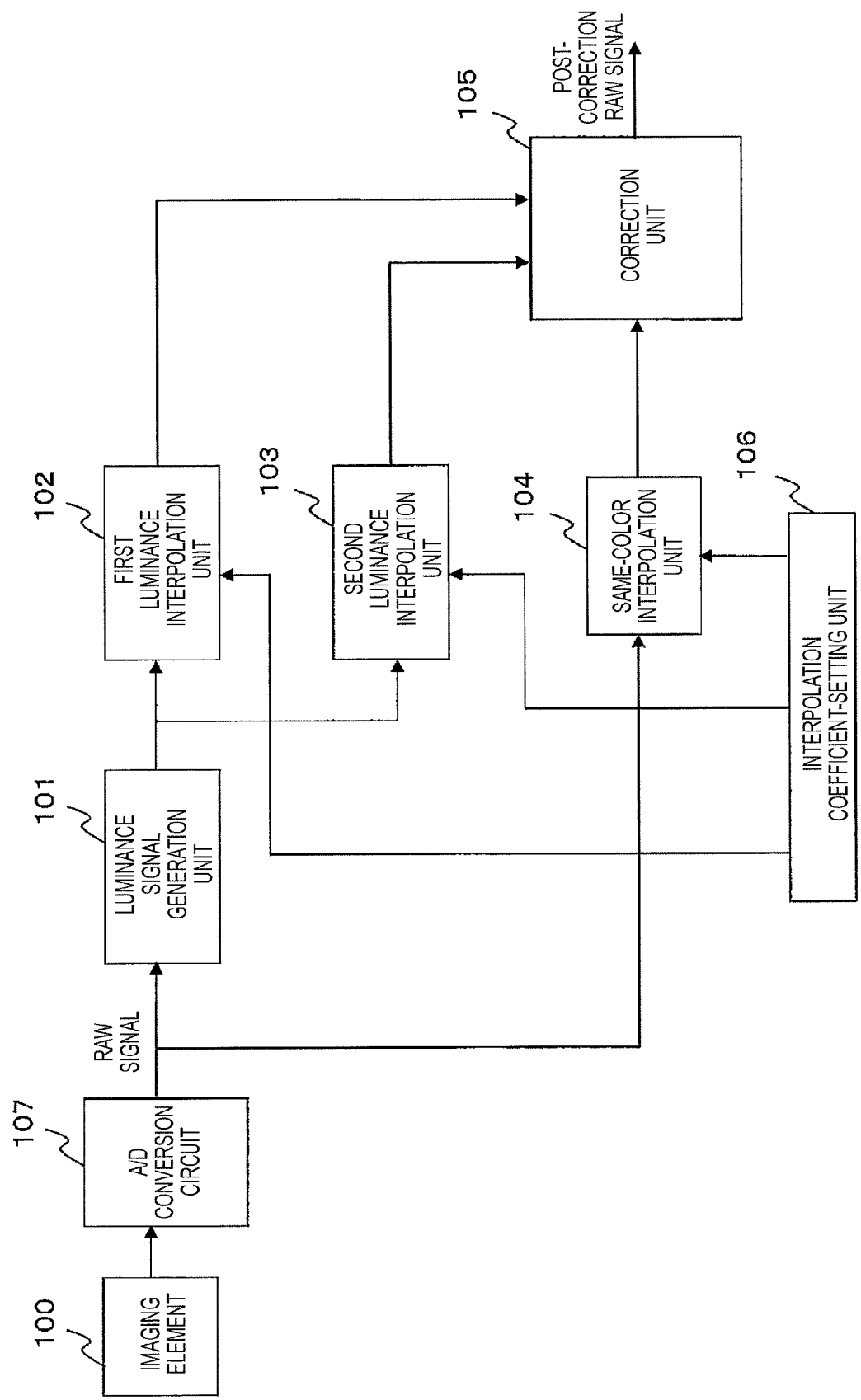
FIG. 1 is a diagram illustrating a first configuration example of an imaging device.

As described in FIG. 1, the imaging device according to the present embodiment is formed by appropriately using a color imaging element 100 having a plurality of color filters, an A/D conversion circuit 107 that A/D-converts an electrical signal output from the imaging device and outputs a digital signal, a luminance signal generation unit 101 that generates a luminance signal from a RAW signal output from the A/D conversion circuit, a first luminance interpolation unit 102 and a second luminance interpolation unit 103 that generate and output interpolation signals respectively by using the generated luminance signal, a same-color interpolation unit 104 that generates an interpolation signal by using a signal of the same color pixels from among the RAW signals output from the A/D conversion circuit, and a correction unit 105 that generates and outputs a correction RAW signal by an arithmetic operation using each interpolation signal. Hereinafter, operations of each component will be described in detail.

Light entered from an object through an imaging lens is irradiated to the imaging element 100 and an object image is formed. The imaging element 100 scans the object in the horizontal and vertical directions by drive pulses of a timing generator, and the imaging element 100 images the object image and generates an electrical signal. The electrical signal is converted into a digital signal by the A/D conversion circuit 107 and input into a signal processing circuit as the RAW signal. In the signal processing circuit, various camera signal processing such as noise elimination and gamma correction in addition to YUV generation processing is performed and the RAW signal is converted into a signal such as a TV signal and then output.

One feature of the present embodiment is a point that correction, in which the center of gravity of each pixel is shifted, such as scaling (magnification/reduction), lens distortion correction, rotation/viewpoint conversion, and correction of distortion occurring when pixel addition is performed in the imaging element, is performed between the A/D conversion circuit and the signal processing, and an output RAW signal with less degradation of resolution is realized at low cost without changing arrangement order of the color filters of the RAW signal.

Figure 2:
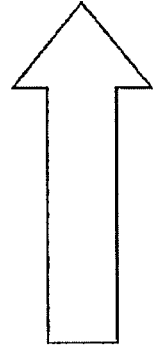
FIG. 2, an item (a) is an operation explanatory diagram (1) of a luminance signal generation unit, and an item (b) is an operation explanatory diagram (2) of the luminance signal generation unit.

An operation of the luminance signal generation unit 101 will be described with reference to FIG. 2.

The RAW signal output from the A/D conversion circuit is sequentially input to the luminance signal generation unit 101 and the same-color interpolation unit 104 for each pixel. When the imaging element is a color single plate imaging element, for example, sets of 2×2 pixels corresponding to color filters of four colors of color A, color B, color C, and color D are arrayed as illustrated in an item (a) of FIG. 2. When the imaging element is a primary color Bayer array, for example, A=R, B=C=G, and D=B may be represented. The luminance signal generation unit 101 generates a luminance signal corresponding to a sampling position of each pixel of the RAW signal by performing interpolation by filter processing. For example, in the case of Y33, a luminance signal (Y) can be generated by an arithmetic operation of the following expression:

$$Y33=(A33+(B32+B34)/2+(C23+C43)/2+(D22+D24+D42+D44)/4)/4. \quad \text{(Expression 1)}$$

For pixels at other positions, the luminance signal (Y) can be generated by the same processing as described above.

The luminance signal generated by the luminance signal generation unit 101 is input to the first luminance interpolation unit 102 and the second luminance interpolation unit 103.

The same-color interpolation unit 104 generates an interpolation signal by interpolating a pixel signal, whose center of gravity is shifted, by filtering using nearby same color pixel signals and outputs the interpolation signal to the correction unit 105.

The first luminance interpolation unit 102 generates an interpolation signal by interpolating a pixel signal, whose center of gravity is shifted, by filtering using a luminance signal at the same sampling position as the position of the pixel used for the filtering by the same-color interpolation unit 104 and outputs the interpolation signal to the correction unit 105.

The second luminance interpolation unit 103 generates an interpolation signal by interpolating a pixel signal, whose center of gravity is shifted, by filtering using a luminance signal partially or entirely different from the luminance signal used by the first luminance interpolation unit to generate the interpolation signal (that is, a nearby luminance signal having the highest correlation with the luminance signal) and outputs the interpolation signal to the correction unit 105.

The signals that are interpolated by the first luminance interpolation unit 102, the second luminance interpolation unit 103, and the same-color interpolation unit 104 are respectively processed by an arithmetic operation in the correction unit 105, and a post-correction RAW signal in which the center of gravity is shifted to a desired position with respect to each pixel of the input RAW signal is output. Here, the correction unit 105 corrects the signal from the same-color interpolation unit 104 by using a ratio between the interpolation signal generated by the first luminance interpolation unit 102 and the interpolation signal generated by the second luminance interpolation unit 103 and outputs the corrected signal.

The details of the operations of the first luminance interpolation unit 102, the second luminance interpolation unit 103, the same-color interpolation unit 104, and the correction unit 105 will be described with reference to FIGS. 3 to 7. Each of FIGS. 3 to 7 shows an example of generating one pixel of color A by interpolation.

FIG. 3 is an example of generating an interpolation signal of color A corresponding to a position of the center of gravity indicated by a mark "★" located between A33, A35, A53, and A55. The position of the center of gravity is closest to A33 among A33, A35, A53, and A55. This is defined as an interpolation coefficient pattern 1 ($\alpha<0.5$ and $\beta<0.5$).

Figure 5:
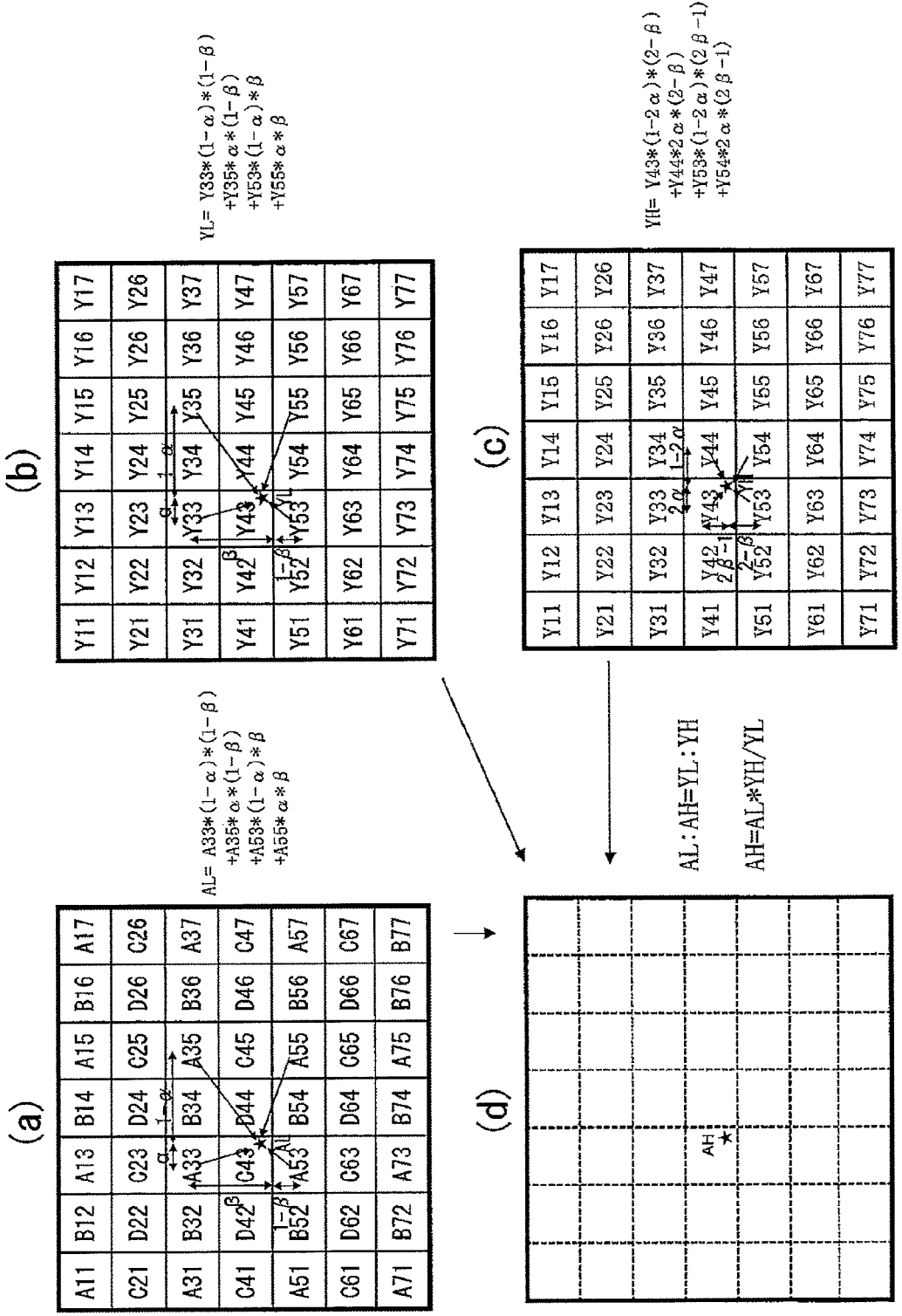
FIG. 5, an item (a) is a supplementary explanatory diagram (1) of an interpolation coefficient pattern 3 (α<0.5 and β>=0.5), an item (b) is a supplementary explanatory diagram (2) of an interpolation coefficient pattern 3 (α<0.5 and β>=0.5), an item (c) is a supplementary explanatory diagram (3) of an interpolation coefficient pattern 3 (α<0.5 and β>=0.5), and an item (d) is a supplementary explanatory diagram (4) of an interpolation coefficient pattern 3 (α<0.5 and β>=0.5)
Figure 6:
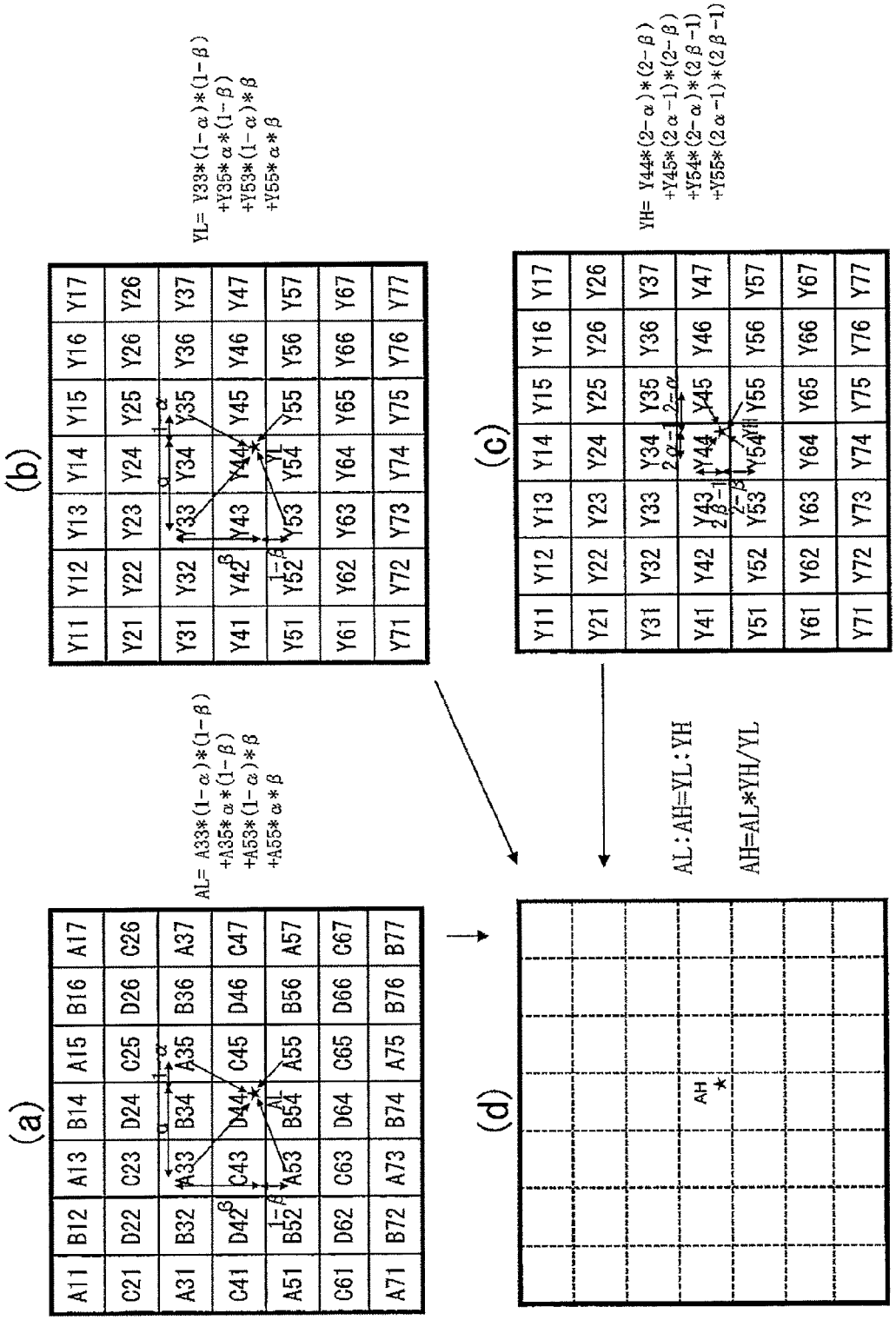
FIG. 6, an item (a) is a supplementary explanatory diagram (1) of an interpolation coefficient pattern 4 (α>=0.5 and β>=0.5), an item (b) is a supplementary explanatory diagram (2) of an interpolation coefficient pattern 4 (α>=0.5 and β>=0.5), an item (c) is a supplementary explanatory diagram (3) of an interpolation coefficient pattern 4 (α>=0.5 and β>=0.5), and an item (d) is a supplementary explanatory diagram (4) of an interpolation coefficient pattern 4 (α>=0.5 and β>=0.5)
Figure 7:
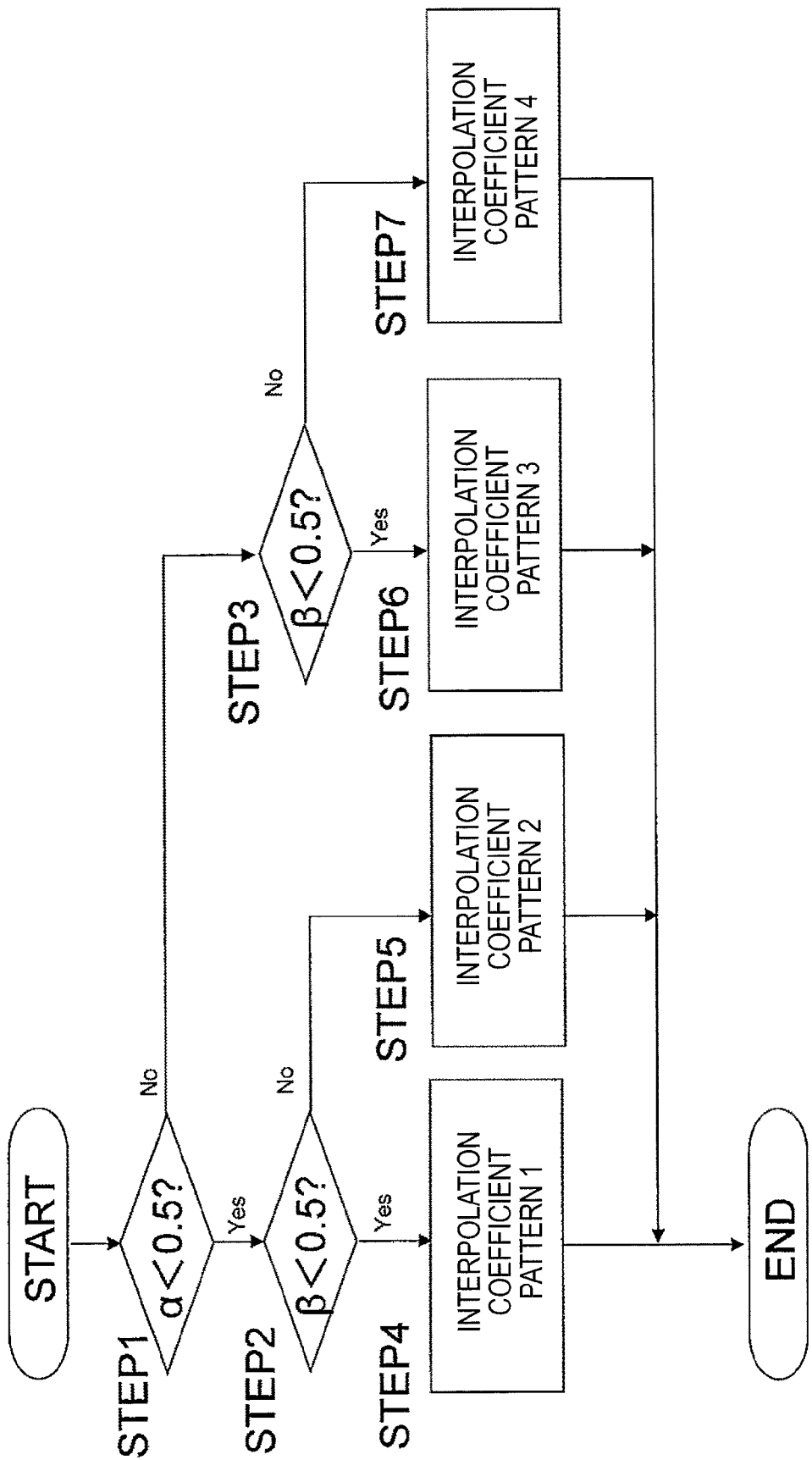
FIG. 7 is a supplementary explanatory diagram of a second luminance interpolation unit.

In the same manner, in FIGS. 4 to 6, a pattern 2 ($\alpha>=0.5$ and $\beta<0.5$), a pattern 3 ($\alpha<0.5$ and $\beta>=0.5$), and a pattern 4 ($\alpha>=0.5$ and $\beta>=0.5$) are defined according to a difference of the closest pixel among A33, A35, A53, and A55. In this way, there are four patterns according to the position of an interpolation pixel to be generated.

Regarding the positions of same-color four pixels and the position of RAW data (AH) to be generated by interpolation, the coefficient $\alpha$ represents a ratio of the position in the horizontal direction and the coefficient $\beta$ represents a ratio of the position in the vertical direction.

First, an example in which post-correction RAW data (AH) is generated at a position in a range of the interpolation coefficient pattern 1 ($\alpha<0.5$ and $\beta<0.5$) for RAW of A33 will be described with reference to FIG. 3.

As illustrated in an item (a) of FIG. 3, the same-color interpolation unit 104 calculates an interpolation signal (AL) by the expression below by using the interpolation coefficients $\alpha$ and $\beta$ set from the interpolation coefficient setting unit 106 and A33, A35, A53, and A55.

$$AL = A33*(1-\alpha)*(1-\beta) + A35*\alpha*(1-\beta) + A53*(1-\alpha)*\beta + A55*\alpha*\beta \quad \text{(Expression 2)}$$

As illustrated in an item (b) of FIG. 3, the first luminance interpolation unit 102 calculates an interpolation signal (YL) by the expression below by using the interpolation coefficients $\alpha$ and $\beta$ set from the interpolation coefficient setting unit 106 and Y33, Y35, Y53, and Y55.

$$YL = Y33*(1-\alpha)*(1-\beta) + Y35*\alpha*(1-\beta) + Y53*(1-\alpha)*\beta + Y55*\alpha*\beta \quad \text{(Expression 3)}$$

As illustrated in an item (c) of FIG. 3, the second luminance interpolation unit 103 calculates an interpolation signal (YH) by the expression below by using the interpolation coefficients $\alpha$ and $\beta$ ($\alpha<0.5$ and $\beta<0.5$) set from the interpolation coefficient setting unit 106 and Y33, Y34, Y43, and Y44.

$$YH = Y33*(1-2\alpha)*(1-2\beta) + Y34*2\alpha*(1-2\beta) + Y43*(1-2\alpha)*2\beta + Y44*2\alpha*2\beta \quad \text{(Expression 4)}$$

The second luminance interpolation unit 103 uses a luminance signal different from that used by the first luminance interpolation unit 102, so that $\alpha$ and $\beta$ of the first luminance interpolation unit 102 correspond to $2\alpha$ and $2\beta$, respectively, of the second luminance interpolation unit 103.

Here, the AL calculated by the same-color interpolation unit 104 is a narrow band (low high-frequency gain and blurred) image signal because the distance between pixels used for interpolation is long. The YL calculated by the first luminance interpolation unit 102 has the same filter characteristics as that of the AL calculated by the same-color interpolation unit 104, so that the YL is a narrow band luminance signal in the same manner. On the other hand, the YH calculated by the second luminance interpolation unit 103 is a broadband luminance signal (whose high frequency gain is higher than that of YL and which is not blurred), because the distance between pixels used for interpolation is short. The luminance signal has a certain correlation with each of color signals A, B, C, and D, so that the following expression is established.

$$AH(\text{broad band}):AL(\text{narrow band}) \approx YH(\text{broad band}):YL(\text{narrow band}) \quad \text{(Expression 5)}$$

Therefore, as illustrated in an item (d) of FIG. 3, the correction unit 105 modifies the above (Expression 5) to obtain the expression below and calculates an interpolation signal AH of color A whose high frequency gain is high and which is not blurred.

$$AH = AL*YH/YL \quad \text{(Expression 6)}$$

Next, an example in which post-correction RAW data (AH) is generated at a position in a range of the interpolation coefficient pattern 2 ($\alpha>=0.5$ and $\beta<0.5$) for RAW of A33 will be described with reference to FIG. 4. Here, the same-color interpolation unit 104, the first luminance interpolation unit 102, and the correction unit 105 perform the same operations as illustrated in FIG. 3, so that the description thereof will be omitted and the operation of the second luminance interpolation unit 103 will be described.

As illustrated in an item (c) of FIG. 4, the second luminance interpolation unit 103 calculates an interpolation signal (YH) by the expression below by using the interpolation coefficients $\alpha$ and $\beta$ ($\alpha>=0.5$ and $\beta<0.5$) set from the interpolation coefficient setting unit 106 and Y34, Y35, Y44, and Y45.

$$YH = Y34*(2-\alpha)*(1-2\beta) + Y35*(2\alpha-1)*(1-2\beta) + Y44*(2-\alpha)*2\beta + Y45*(2\alpha-1)*2\beta \quad \text{(Expression 7)}$$

The second luminance interpolation unit 103 uses a luminance signal different from that used by the first luminance interpolation unit 102, so that $\alpha$, $(1-\alpha)$, and $\beta$ of the first luminance interpolation unit 102 correspond to $(2\alpha-1)$, $(2-\alpha)$, and $2\beta$, respectively, of the second luminance interpolation unit 103.

Next, an example in which post-correction RAW data (AH) is generated at a position in a range of the interpolation coefficient pattern 3 ($\alpha<0.5$ and $\beta>=0.5$) for RAW of A33 will be described with reference to FIG. 5. In the same manner as the above description, the operation of the second luminance interpolation unit 103 will be described.

As illustrated in an item (c) of FIG. 5, the second luminance interpolation unit 103 calculates an interpolation signal (YH) by the expression below by using the interpolation coefficients $\alpha$ and $\beta$ ($\alpha<0.5$ and $\beta>=0.5$) set from the interpolation coefficient setting unit 106 and Y43, Y44, Y53, and Y54.

$$YH=Y43*(1-2\alpha)*(2-\beta)+Y44*2\alpha*(2-\beta)+Y53*(1-2\alpha)*(2\beta-1)+Y54*2\alpha*(2\beta-1) \quad \text{(Expression 8)}$$

The second luminance interpolation unit 103 uses a luminance signal different from that used by the first luminance interpolation unit 102, so that $\alpha$, $\beta$, and $(1-\beta)$ of the first luminance interpolation unit 102 correspond to $2\alpha$, $(2\beta-1)$, and $(2-\beta)$, respectively, of the second luminance interpolation unit 103.

Next, an example in which post-correction RAW data (AH) is generated at a position in a range of the interpolation coefficient pattern 4 ($\alpha>=0.5$ and $\beta>=0.5$) for RAW of A33 will be described with reference to FIG. 6. In the same manner as the above description, the operation of the second luminance interpolation unit 103 will be described.

As illustrated in an item (c) of FIG. 6, the second luminance interpolation unit 103 calculates an interpolation signal (YH) by the expression below by using the interpolation coefficients $\alpha$ and $\beta$ ($\alpha>=0.5$ and $\beta>=0.5$) set from the interpolation coefficient setting unit 106 and Y43, Y44, Y53, and Y54.

$$YH=Y44*(2-\alpha)*(2-\beta)+Y45*(2\alpha-1)*(2-\beta)+Y54*(2-\alpha)*(2\beta-1)+Y55*(2\alpha-1)*(2\beta-1) \quad \text{(Expression 9)}$$

The second luminance interpolation unit 103 uses a luminance signal different from that used by the first luminance interpolation unit 102, so that $\alpha$, $(1-\alpha)$, $\beta$, and $(1-\beta)$ of the first luminance interpolation unit 102 correspond to $(2\alpha-1)$, $(2-\alpha)$, $(2\beta-1)$, and $(2-\beta)$, respectively, of the second luminance interpolation unit 103.

As described above, the second luminance interpolation unit 103 is required to change the coefficients according to the position of the center of gravity of the interpolation pixel to be generated. The method in which the second luminance interpolation unit 103 changes the coefficients will be supplementary described with reference to FIG. 7.

The second luminance interpolation unit 103 divides processing into four patterns by the interpolation coefficients $\alpha$ and $\beta$ set from the interpolation coefficient setting unit 106.

In STEP 1, the second luminance interpolation unit 103 determines whether the interpolation coefficient $\alpha$ set from the interpolation coefficient setting unit 106 satisfies $\alpha<0.5$ by comparison. If true, the second luminance interpolation unit 103 branches to STEP 2. If false, the second luminance interpolation unit 103 branches to STEP 3. In STEP 2, the second luminance interpolation unit 103 determines whether the interpolation coefficient $\beta$ set from the interpolation coefficient setting unit 106 satisfies $\beta<0.5$ by comparison. If true, the second luminance interpolation unit 103 branches to STEP 4. If false, the second luminance interpolation unit 103 branches to STEP 5. In STEP 4, the processing of the interpolation coefficient pattern 1 ($\alpha<0.5$ and $\beta<0.5$) described above is performed. In STEP 5, the processing of the interpolation coefficient pattern 2 ($\alpha>=0.5$ and $\beta<0.5$) described above is performed.

In STEP 3, the second luminance interpolation unit 103 determines whether the interpolation coefficient $\beta$ set from the interpolation coefficient setting unit 106 satisfies $\beta<0.5$ by comparison. If true, the second luminance interpolation unit 103 branches to STEP 6. If false, the second luminance interpolation unit 103 branches to STEP 7. In STEP 6, the processing of the interpolation coefficient pattern 3 ($\alpha<0.5$ and $\beta>=0.5$) described above is performed. In STEP 7, the processing of the interpolation coefficient pattern 4 ($\alpha>=0.5$ and $\beta>=0.5$) described above is performed.

By the above operation, the second luminance interpolation unit 103 selectively performs one of the four processing operations according to the interpolation coefficients $\alpha$ and $\beta$ set from the interpolation coefficient setting unit 106 and generates the interpolation signal (YH).

By the above configuration, it is possible to generate a signal formed by shifting the center of gravity of the RAW signal by interpolation while suppressing deterioration of resolution. Further, it is possible to generate an interpolation signal by a small scale circuit because the bit width of the RAW signal is generally smaller than that of an RGB signal and a YUV signal.

Although, in the description of the example of the present embodiment, the second luminance interpolation unit 103 determines the four patterns and selectively performs one of the processing operations according to the pattern, for example, the interpolation coefficient setting unit 106 may determine the four patterns and supply pattern information to the second luminance interpolation unit 103 and the second luminance interpolation unit 103 may selectively performs one of the processing operations according to the pattern information.

Second Embodiment

Figure 8:
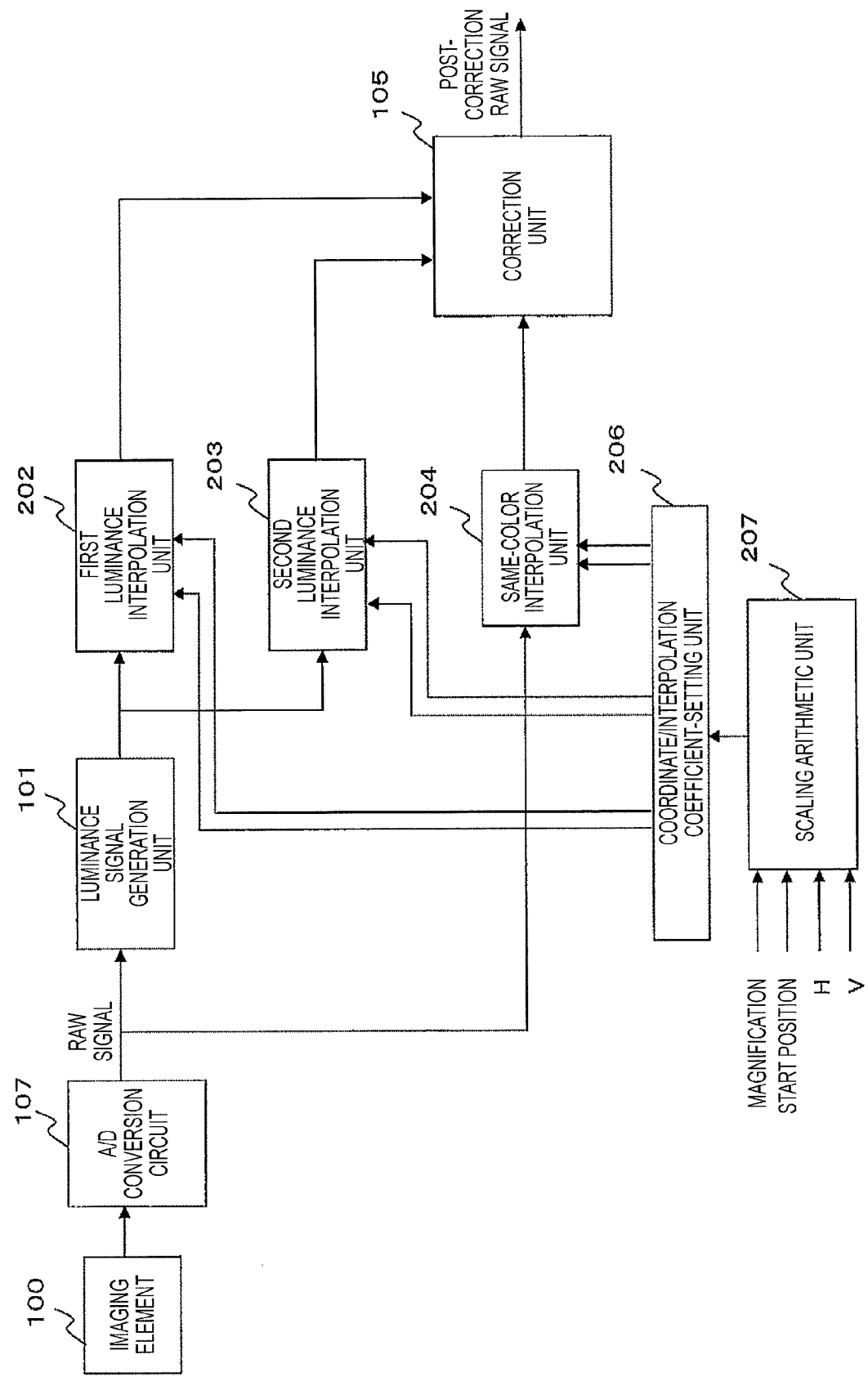
FIG. 8 is a diagram illustrating a second configuration example of the imaging device.

A second embodiment of the imaging device will be described with reference to FIGS. 8 to 12. In FIG. 8, description of components that perform the same operation as those in FIG. 1 will be appropriately omitted and different components will be mainly described.

As a difference from the configuration of the first embodiment, the second embodiment includes, instead of the interpolation coefficient setting unit 106 of the first embodiment, a scaling arithmetic unit 207 to which a magnification and a start position indicated from a control microcomputer or the like (not illustrated) are input and horizontal (H) and vertical (V) coordinate information synchronized with a RAW signal provided from a timing generator or the like (not illustrated) is input and which calculates coordinates after scaling (magnification/reduction) for each pixel from the above input information and outputs the coordinates sequentially for each pixel to a coordinate/interpolation coefficient setting unit 206 and the coordinate/interpolation coefficient setting unit 206 which outputs the coordinate information from the scaling arithmetic unit 207 and the interpolation coefficients $\alpha$ and $\beta$ calculated from the coordinate information to a first luminance interpolation unit 202, a second luminance interpolation unit 203, and a same-color interpolation unit 204.

The first luminance interpolation unit 202, the second luminance interpolation unit 203, and the same-color interpolation unit 204 select same-color four pixels surrounding the position of the coordinate information from the scaling arithmetic unit 207 and perform the same interpolation processing as that illustrated in FIG. 1 on the position of the same-color four pixels.

Next, an example of magnification and reduction operations will be described with reference to FIGS. 9 and 10, respectively.

Figure 9:
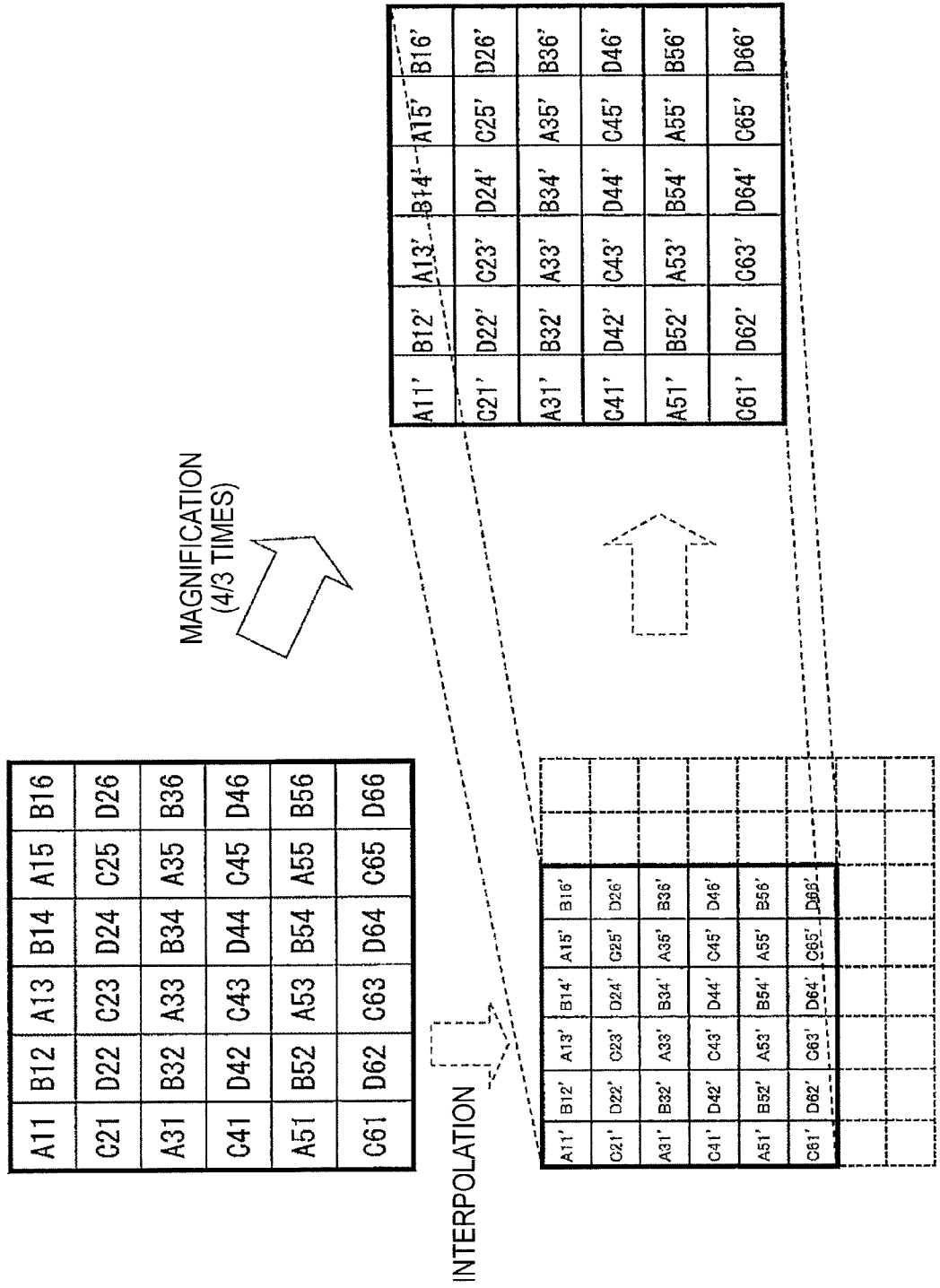
FIG. 9 is a supplementary explanatory diagram during magnification.

FIG. 9 is a supplementary diagram for explaining the operation during magnification in which an image is magnified $8/6=4/3$ times from the upper-left portion. In FIG. 9, 8*8 pixels are arranged in the same area as that of 6*6 pixels in the horizontal and vertical directions and a start point and ratios of the interpolation coefficients α and β are sequentially assigned to each of the 8*8 pixels so that the start point and the ratios of the interpolation coefficients α and β form the center of gravity of each of the 8*8 pixels, so that post-correction RAW signals of A11', B12', A13', B14', A15', B16', C21', D22', C23', D24', C25', D26', A31', B32', A33', B34', A35', B36', C41', D42', C43', D44', C45', D46', A51', B52', A53', B54', A55', B56', C61', D62', C63', D64', C65', and D66' are generated by the interpolation described above. Thereafter, the post-correction RAW signals are processed at the same speed as that of the original RAW signals, so that the desired 4/3 times magnification processing can be performed.

Figure 10:
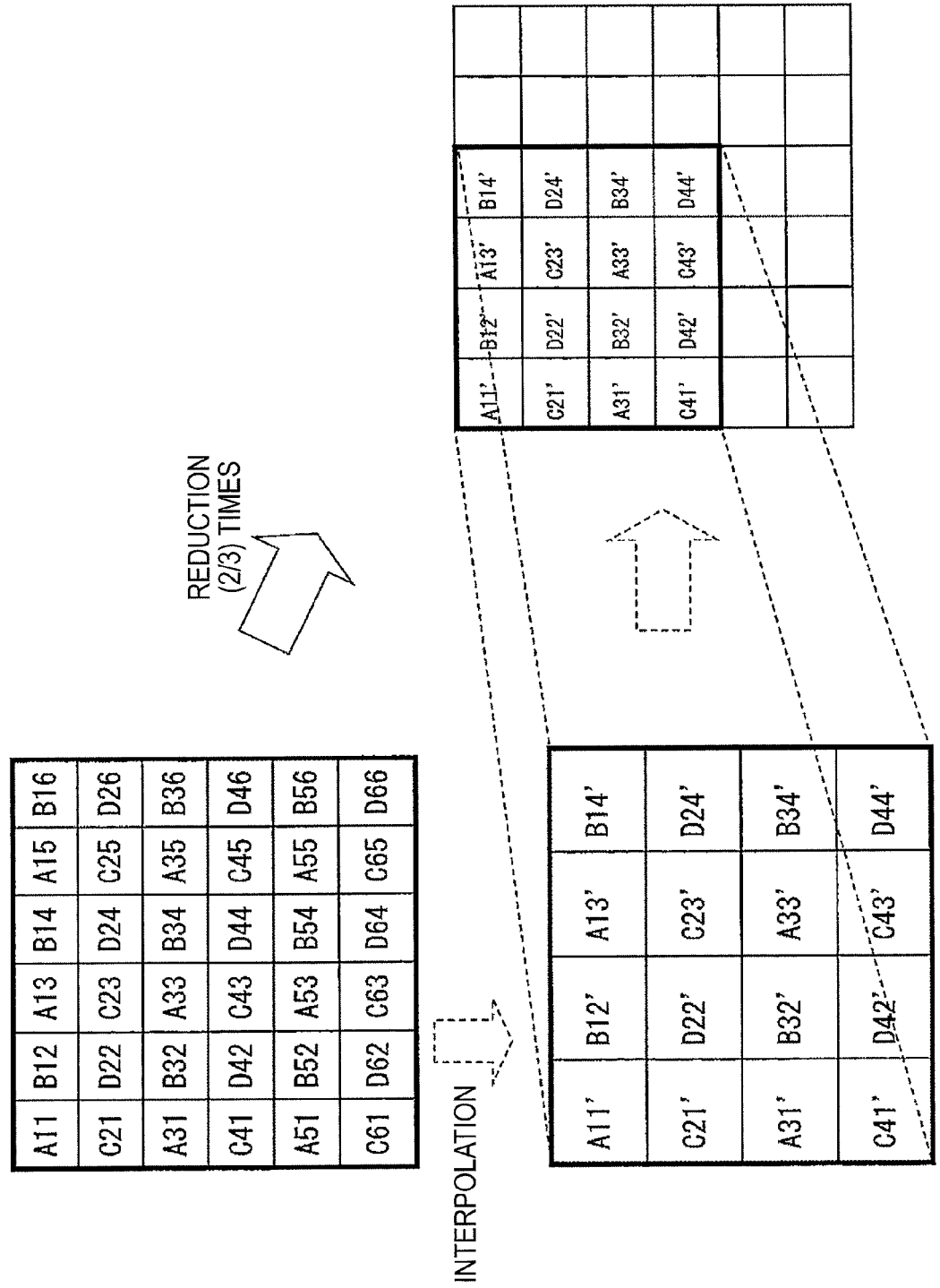
FIG. 10 is a supplementary explanatory diagram during reduction.

FIG. 10 is a supplementary diagram for explaining the operation during reduction in which an image is reduced 4/6=2/3 times from the upper-left portion. In FIG. 10, 4*4 pixels are arranged in the same area as that of 6*6 pixels in the horizontal and vertical directions and a start point and ratios of the interpolation coefficients α and β are sequentially assigned to each of the 4*4 pixels so that the start point and the ratios of the interpolation coefficients α and β form the center of gravity of each of the 4*4 pixels, so that post-correction RAW signals of A11', B12', A13', B14', C21', D22', C23', D24', A31', B32', A33', B34', C41', D42', C43', and D44' are generated by the interpolation described above. Thereafter, the post-correction RAW signals are processed at the same speed as that of the original RAW signals, so that the desired 2/3 times reduction processing can be performed.

Further, an example of scaling arithmetic operation in the case of FIGS. 9 and 10 will be described with reference to FIGS. 11 and 12, respectively.

Figure 11:
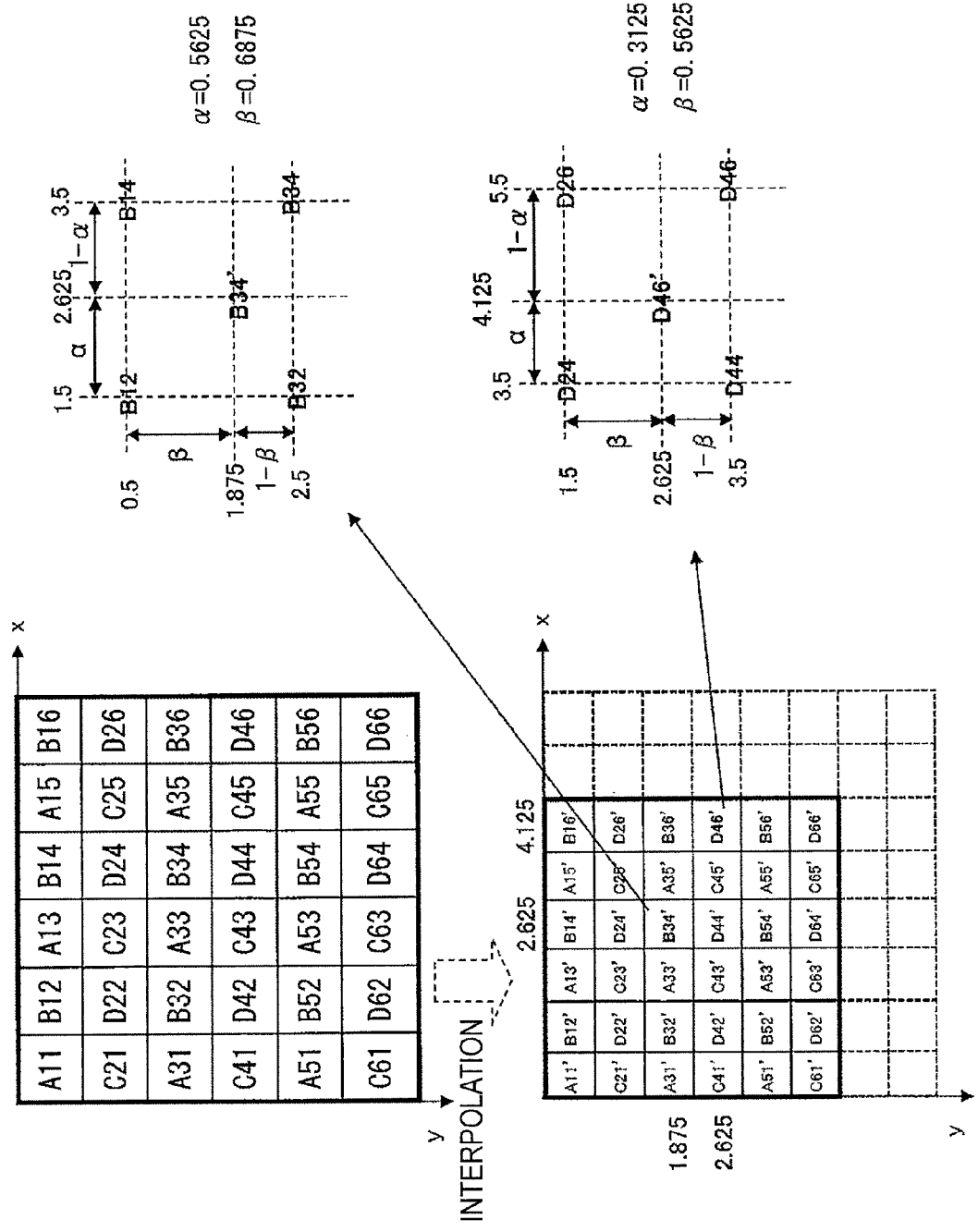
FIG. 11 is a scaling arithmetic operation during magnification.

FIG. 11 is an example of the scaling arithmetic operation for B34' and D46' during the magnification in FIG. 9.

The center of gravity coordinates of B34' is (3.5*3/4, 2.5*3/4)=(2.625, 1.875), so that this value is an output from the scaling arithmetic unit 207. The coordinate/interpolation coefficient setting unit 206 outputs coordinate information (2.625, 1.875), and α=0.5625 and β=0.6875 which are obtained from the coordinate information. The first luminance interpolation unit 202, the second luminance interpolation unit 203, and the same-color interpolation unit 204 select same-color four pixels B12, B14, B32, and B34 which surround the coordinates. In the same manner, for D46', the coordinates=(4.125, 2.625), α=0.3125, β=0.5625, and the same-color four pixels are D24, D26, D44, and D46.

Figure 12:
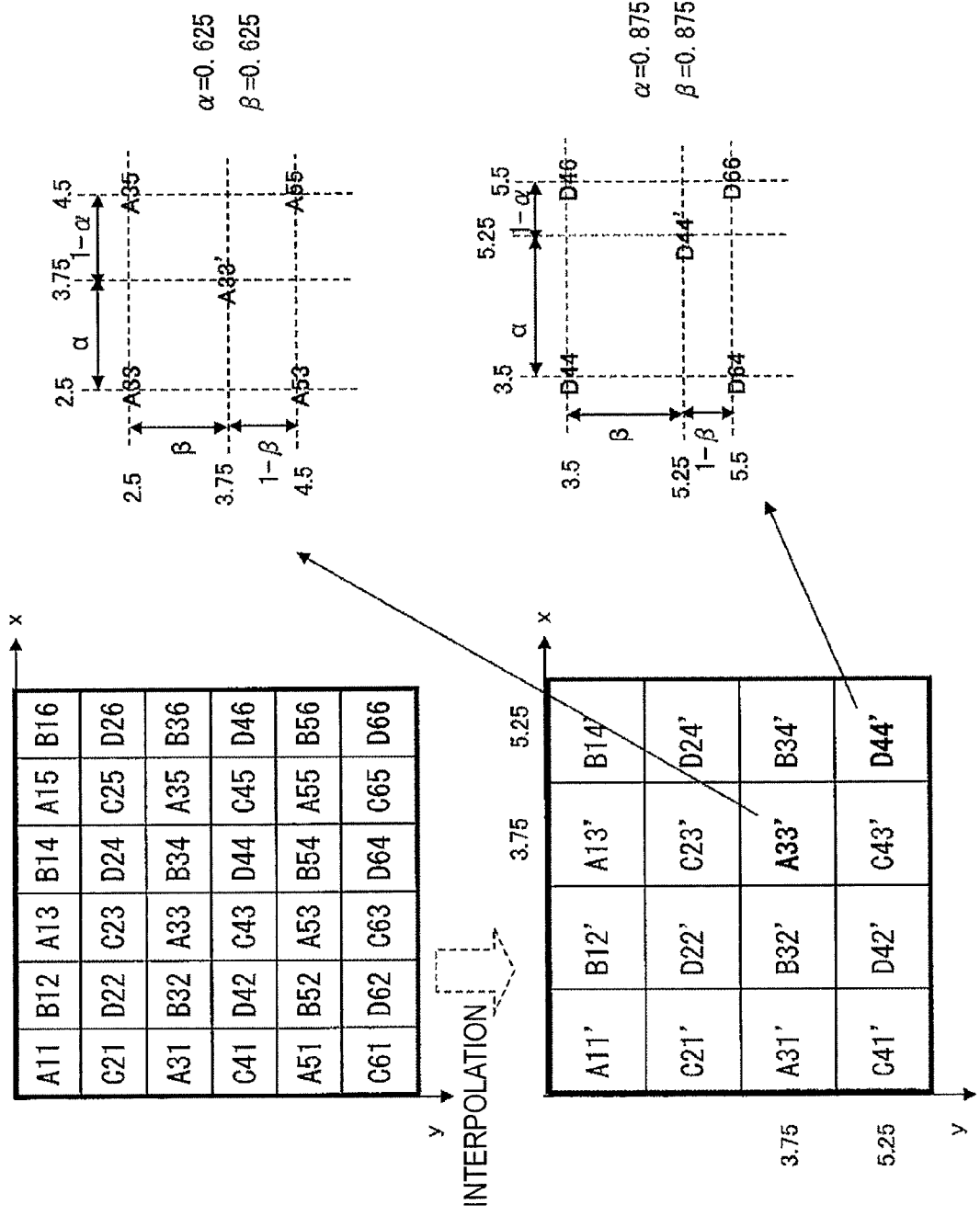
FIG. 12 is a scaling arithmetic operation during reduction.

FIG. 12 is an example of the scaling arithmetic operation for A33' and D44' during the reduction in FIG. 10. The center of gravity coordinates of A33' is (2.5*3/2, 2.5*3/2)=(3.75, 3.75), so that this value is an output from the scaling arithmetic unit 207. The coordinate/interpolation coefficient setting unit 206 outputs coordinate information (3.75, 3.75), and α=0.625 and β=0.625 which are obtained from the coordinate information. The first luminance interpolation unit 202, the second luminance interpolation unit 203, and the same-color interpolation unit 204 select same-color four pixels A33, A35, A53, and A55 which surround the coordinates. In the same manner, for D44', the coordinates=(5.25, 5.25), α=0.875, β=0.875, and the same-color four pixels are D44, D46, D64, and D66.

By the above configuration, the imaging device according to the present embodiment can generate a scaled (magnified/reduced) RAW signal while suppressing deterioration of resolution. Further, it is possible to provide an imaging device having a scaling function with a small circuit scale because the bit width of the RAW signal is generally smaller than that of an RGB signal and a YUV signal.

Third Embodiment

Figure 13:
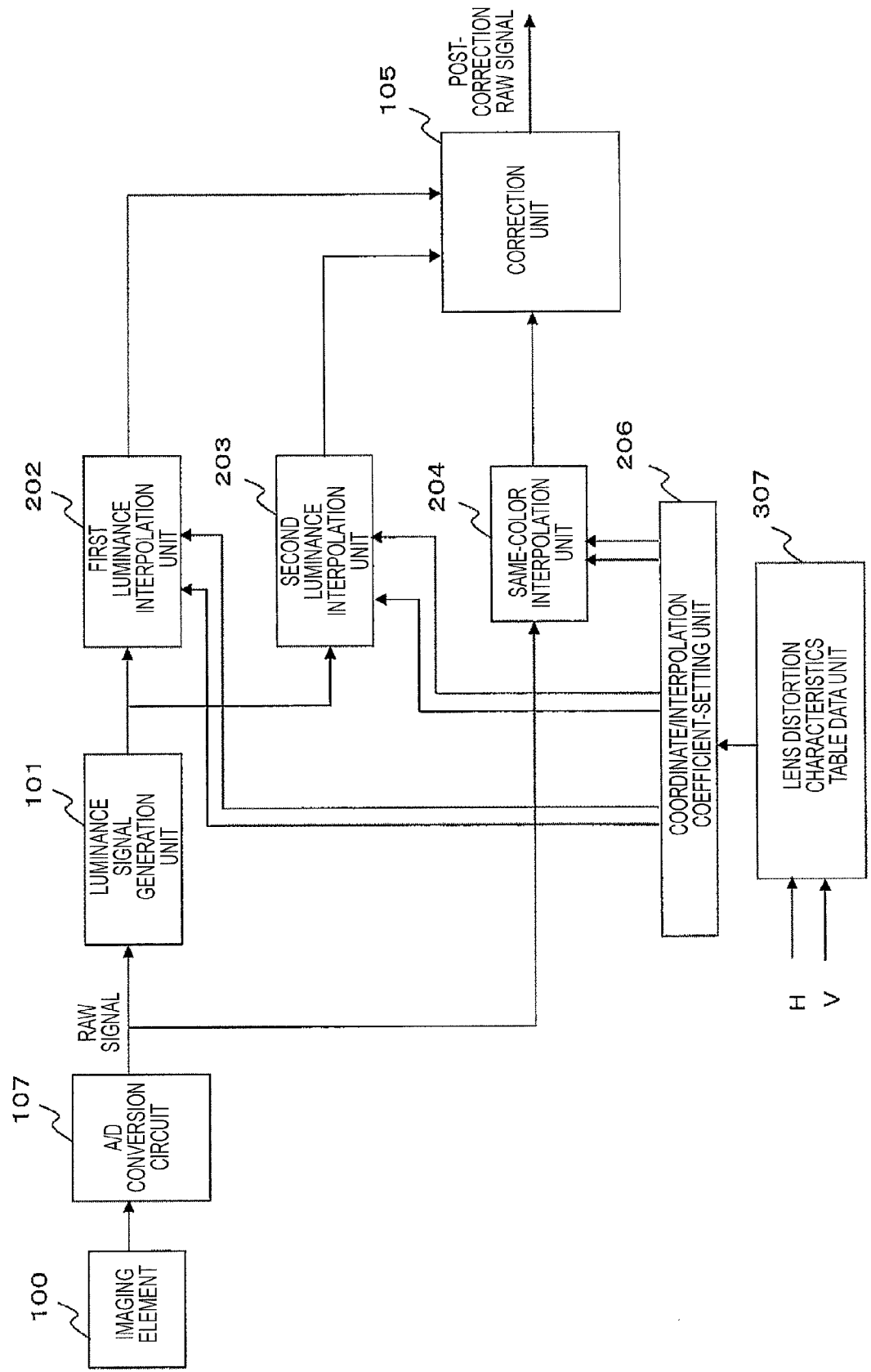
FIG. 13 is a diagram illustrating a third configuration example of the imaging device.
Figure 14:
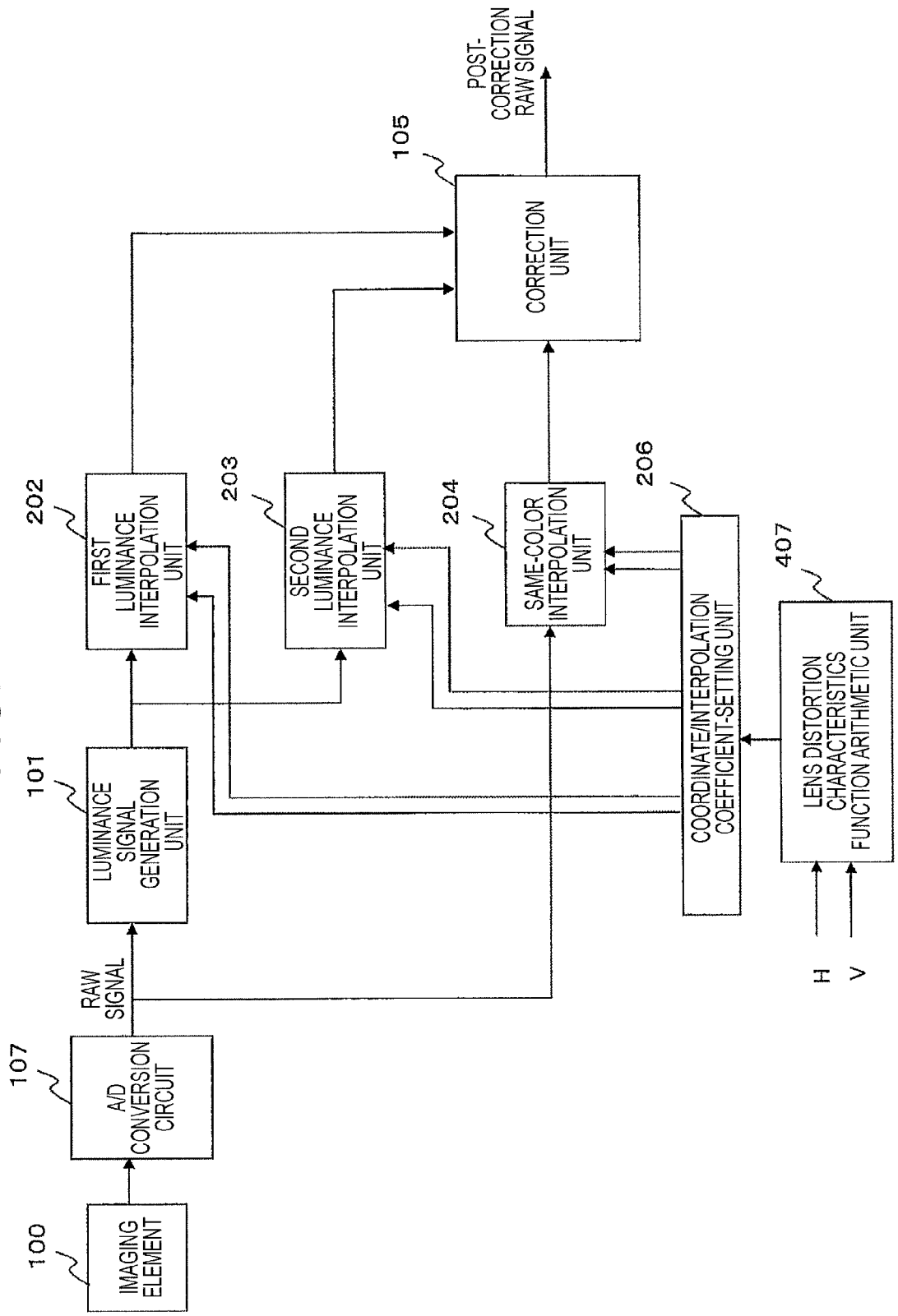
FIG. 14 is a diagram illustrating a fourth configuration example of the imaging device.

Another modified example of the imaging device will be described with reference to FIGS. 13 to 15. In FIGS. 13 and 14, description of components that perform the same operation as those in FIGS. 1 and 8 will be appropriately omitted and different components will be mainly described.

FIG. 13 is a diagram illustrating a third configuration example of the imaging device, which includes a lens distortion correction function. As a difference from the first embodiment, the configuration example of the lens distortion correction function of the present embodiment includes, instead of the interpolation coefficient setting unit of the first embodiment, a lens distortion characteristics table data unit 307 which stores the amount of shift of coordinates of each pixel according to lens distortion characteristics as table data, calculates coordinates after lens distortion correction by reading table data corresponding to horizontal (H) and vertical (V) coordinate information synchronized with a position of RAW data provided from a timing generator or the like (not illustrated) and adding the coordinate information to the table data, and sequentially outputs the calculated coordinates for each pixel to the coordinate/interpolation coefficient setting unit 206, and the coordinate/interpolation coefficient setting unit 206 which outputs the coordinate information from the lens distortion characteristics table data unit 307 and the interpolation coefficients α and β calculated from the coordinate information to the first luminance interpolation unit 202, the second luminance interpolation unit 203, and the same-color interpolation unit 204.

FIG. 14 is a diagram illustrating a fourth configuration example as a modified example of the imaging device which includes a lens distortion correction function. As a difference from the first embodiment, the configuration example of the lens distortion correction function of the present embodiment includes, instead of the interpolation coefficient setting unit of the first embodiment, a lens distortion characteristics function arithmetic unit 407 to which horizontal (H) and vertical (V) coordinate information synchronized with a position of RAW data provided from a timing generator or the like (not illustrated) is input and which calculates coordinates after lens distortion correction by calculating the amount of distortion according to a distance from the center of the lens to the current coordinates by a calculation formula according to lens characteristics and correcting the amount of distortion in a direction from the center position of the imaging element to the current pixel and sequentially outputs the calculated coordinates for each pixel to the coordinate/interpolation coefficient setting unit 206, and the coordinate/interpolation coefficient setting unit 206 which outputs the coordinate information from the lens distortion characteristics function arithmetic unit 407 and the interpolation coefficients α and β calculated from the coordinate information to the first luminance interpolation unit 202, the second luminance interpolation unit 203, and the same-color interpolation unit 204.

Figure 15:
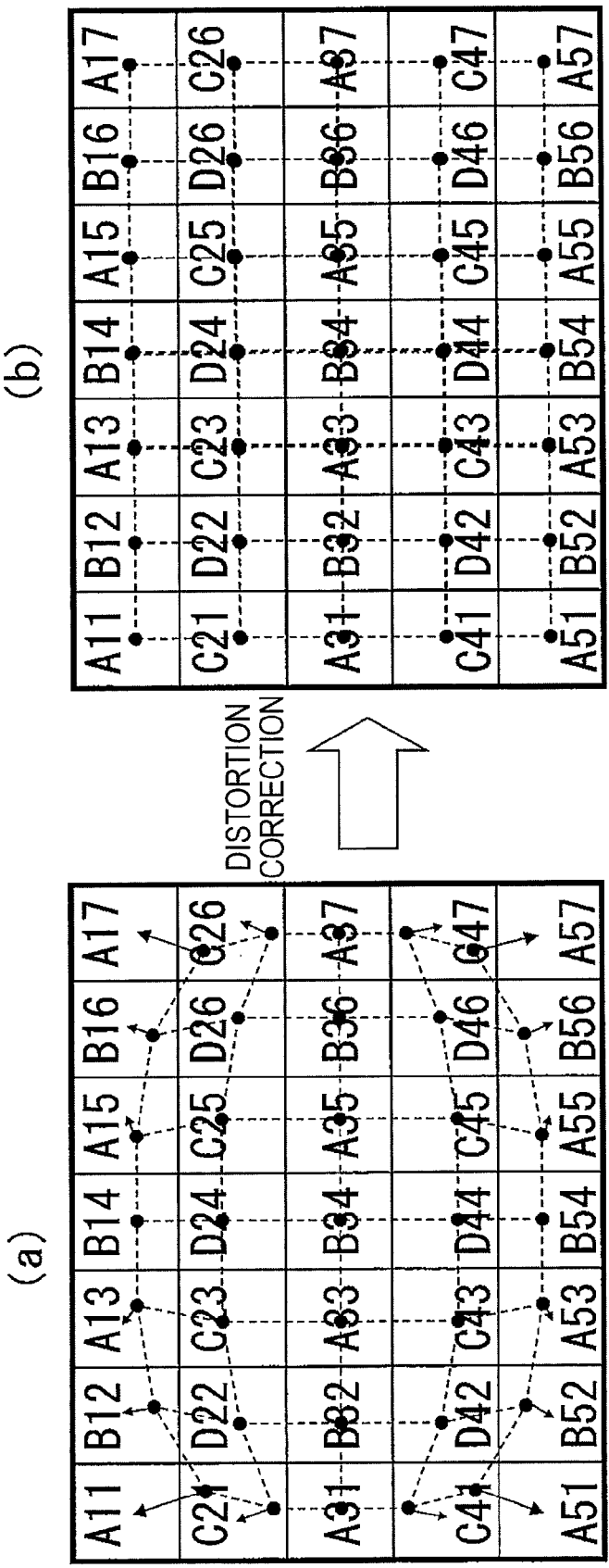
FIG. 15, an item (a) is a supplementary explanatory diagram (1) of a distortion correction function, an item (b) is a supplementary explanatory diagram (2) of the distortion correction function.

FIG. 15 is a supplementary diagram for explaining the distortion correction function. An item (a) of FIG. 15 is a diagram before distortion correction. An item (b) of FIG. 15 is a diagram after distortion correction. The dashed lines indicate the distortion characteristics of the lens. A dot indicates the position of the center of gravity of a pixel. An arrow indicates a vector where the center of gravity of a pixel moves from before the lens distortion correction to after the lens distortion correction.

In the third configuration example of the imaging device, the vectors are stored in the lens distortion characteristics table data unit 307 as table data and the coordinate/interpolation coefficient setting unit 206 individually generates interpolation coefficients to correct the lens distortion on the basis of the lens distortion characteristics table data for each of the first luminance interpolation unit 202, the second luminance interpolation unit 203, and the same-color interpolation unit 204, and individually outputs the interpolation coefficients to each of these units.

In the fourth configuration example of the imaging device, the magnitude of the vectors are predetermined as a function according to a distance from the center of the imaging element in a lens distortion characteristics function arithmetic unit 407, the lens distortion characteristics function arithmetic unit 407 calculates coordinates after lens distortion characteristics correction for each pixel on the basis of a preset lens distortion characteristics function, and the coordinate/interpolation coefficient setting unit 206 individually sets interpolation coefficients to correct the lens distortion on the basis of information from the lens distortion characteristics function arithmetic unit 407 for each of the first luminance interpolation unit 202, the second luminance interpolation unit 203, and the same-color interpolation unit 204, and individually outputs the interpolation coefficients to each of these units.

In any one of the imaging devices, the same processing as that in the first embodiment is performed between the respective interpolation units on the basis of the coordinates after the lens distortion correction, and interpolation of RAW data is performed.

As described above, the interpolation of RAW data is performed while having the effect of the first embodiment, so that it is possible to realize the distortion correction function.

In the present embodiment, a case of barrel distortion is described as an example. However, it is not limited to this, but for example, the present embodiment can be applied to a case of pincushion distortion and the same effect as that of the present embodiment can be obtained.

In the table data method described above, even if the number of the table data is reduced and the reduced portion is compensated by arithmetic operations, the present invention can be applied and the same effect as that of the present embodiment can be obtained.

In the table data method of the first configuration example of the above lens distortion correction function, if distortion data corresponding to each color in the RAW signal is individually held and an interpolation signal is individually generated for each color signal, it is possible to correct not only the distortion but also chromatic aberration of magnification among the lens distortions while having the effect of the first embodiment.

In the lens function method of the second configuration example of the above lens distortion correction function, if distortion function corresponding to each color in the RAW signal is individually held and an interpolation signal is individually generated for each color signal, it is possible to correct not only the distortion but also chromatic aberration of magnification among the lens distortions while having the effect of the first embodiment.

In the above description of the present invention, an example is described in which color filters of 2*2 pixels are periodically arranged in the horizontal and vertical directions. However, the arrangement is not limited to the 2*2 arrangement, and the present invention can be applied to an imaging element of 2*4 arrangement, an imaging element of a special arrangement such as a honeycomb structure, and an imaging element of another color filter arrangement, in the same manner.

Further, in the description of the present invention, the scaling (magnification/reduction) and the lens distortion correction function are described. However, the present invention can be applied to any other function that can be realized by performing correction to shift the center of gravity with respect to the RAW signal.

The present invention is not limited to the embodiments described above, but includes various modified examples. For example, the above embodiments are described in detail in order to explain the present invention in an easy-to-understand manner, so that the embodiments are not necessarily limited to the configurations including all the components described above. Some components of one embodiment can be replaced by components of another embodiment and some components of one embodiment can be added to components of another embodiment. For a part of components of each embodiment, addition, deletion, or replacement of another component can be performed.

Part or all of the components described above may be configured by hardware or may be configured to be realized by a processor executing a program. Control lines and information lines that are considered to be necessary for the description are illustrated. All control lines and information lines required for a product are not necessarily illustrated. It can be considered that substantially all the components are connected to each other in practice.

REFERENCE SIGNS LIST 101 luminance signal generation unit
102 first luminance interpolation unit
103 second luminance interpolation unit
104 same-color interpolation unit
105 correction unit
106 interpolation coefficient setting unit
206 coordinate/interpolation coefficient setting unit
207 scaling arithmetic unit
307 lens distortion characteristics table data unit
407 lens distortion characteristics function arithmetic unit

The invention claimed is:
1. An imaging device that images an object, the imaging device comprising:
an imaging element including a plurality of color filters;
a same-color interpolation unit that generates a lens distortion-corrected interpolation signal by using a same-color pixel in an image signal from the imaging element;
a luminance signal generation unit that generates a luminance signal from the image signal from the imaging element;
a first luminance interpolation unit and a second luminance interpolation unit that use the luminance signal generated by the luminance signal generation unit to generate a lens distortion-corrected interpolation signal;
a lens distortion characteristics table data unit that holds information of coordinates after lens distortion characteristics correction in a memory;
a coordinate/interpolation coefficient setting unit that individually generates interpolation coefficients for correcting lens distortion for each of the same-color interpolation unit, the first luminance interpolation unit, and the second luminance interpolation unit on the basis of information from the lens distortion characteristics table data unit; and
a correction unit that outputs an interpolation signal that corrects a signal from the same-color interpolation unit from a ratio between the interpolation signal generated by the first luminance interpolation unit and the interpolation signal generated by the second luminance interpolation unit.

2. An imaging device that images an object, the imaging device comprising:
- an imaging element including a plurality of color filters;
- a same-color interpolation unit that generates a lens distortion-corrected interpolation signal by using a same-color pixel in an image signal from the imaging element;
- a luminance signal generation unit that generates a luminance signal from the image signal from the imaging element;
- a first luminance interpolation unit and a second luminance interpolation unit that use the luminance signal generated by the luminance signal generation unit to generate a lens distortion-corrected interpolation signal;
- a lens distortion characteristics function arithmetic unit that calculates coordinates after lens distortion characteristics correction for each pixel on the basis of a preset lens distortion characteristics function;
- a coordinate/interpolation coefficient setting unit that individually sets interpolation coefficients for correcting lens distortion for each of the same-color interpolation unit, the first luminance interpolation unit, and the second luminance interpolation unit on the basis of information from the lens distortion characteristics function arithmetic unit; and
- a correction unit that outputs an interpolation signal that corrects a signal from the same-color interpolation unit from a ratio between the interpolation signal generated by the first luminance interpolation unit and the interpolation signal generated by the second luminance interpolation unit.

3. The imaging device according to claim 1, wherein the first luminance interpolation unit generates an interpolation signal by using a luminance signal at the same sampling position as a position of a pixel used when the same-color interpolation unit generates the interpolation signal, and
the second luminance interpolation unit generates an interpolation signal by using a luminance signal partially or entirely different from the luminance signal used when the first luminance interpolation unit generates the interpolation signal.

4. The imaging device according to claim 1, wherein
the lens distortion characteristics table data unit individually holds distortion data corresponding to each color in a pixel signal from the imaging element, and
the same-color interpolation unit, the first luminance interpolation unit, and the second luminance interpolation unit individually generate an interpolation signal for each color.

5. The imaging device according to claim 2, wherein
the lens distortion characteristics function arithmetic unit individually holds a distortion function corresponding to each color in a pixel signal from the imaging element, and
the same-color interpolation unit, the first luminance interpolation unit, and the second luminance interpolation unit individually generate an interpolation signal for each color.

6. The imaging device according to claim 2, wherein
the first luminance interpolation unit generates an interpolation signal by using a luminance signal at the same sampling position as a position of a pixel used when the same-color interpolation unit generates the interpolation signal, and
the second luminance interpolation unit generates an interpolation signal by using a luminance signal partially or entirely different from the luminance signal used when the first luminance interpolation unit generates the interpolation signal.

* * * * *